May 8, 1951  E. G. GARDINER  2,552,166
THRUST BEARING ARRANGEMENT
Filed April 22, 1949
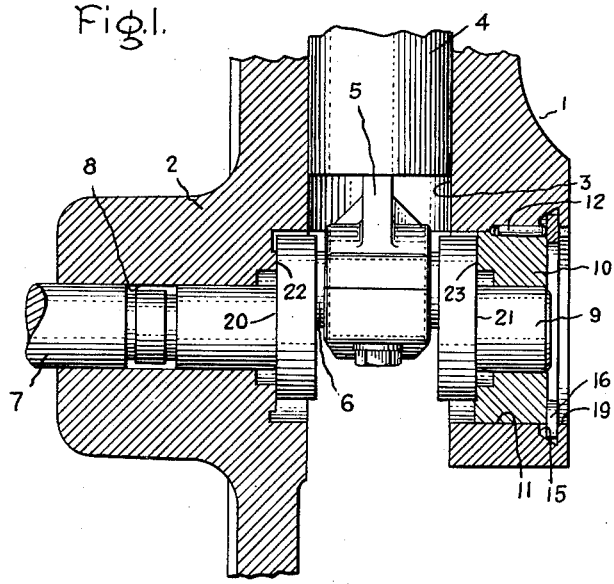
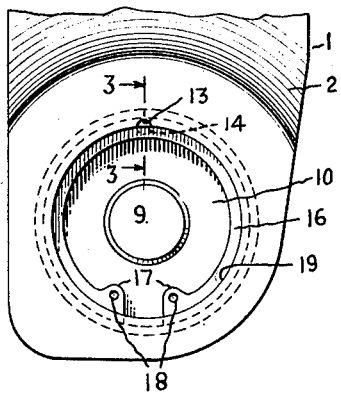
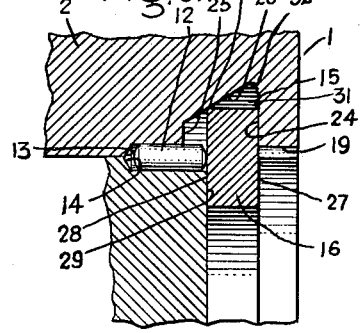
Inventor:
Emmett G Gardiner,
by William G Edwards, Jr.
His Attorney.

Patented May 8, 1951

2,552,166

UNITED STATES PATENT OFFICE 2,552,166

THRUST BEARING ARRANGEMENT

Emmett G. Gardiner, Erie, Pa., assignor to General Electric Company, a corporation of New York Application April 22, 1949, Serial No. 89,030

3 Claims. (Cl. 308—163)

My invention relates to compressors and more particularly to reciprocating compressors for refrigerating apparatus and the like.

It is an object of my invention to provide an improved arrangement for adjusting end play and properly aligning the parts of a reciprocating compressor.

Further objects and advantages of my invention will become apparent as the following description proceeds, and the features of novelty which characterize my invention will be pointed out with particularity in the claims annexed to and forming part of this specification.

In carrying out my invention a snap ring fitting within a groove in the frame of the compressor is utilized to provide a thrust bearing adjustably positioning the shaft in accordance with the thickness of the ring used. In my improved arrangement the bottom of the groove is inclined so that the ring is urged into a flush position against a wall of the groove and inaccuracies in the positioning of the ring and distortions and warpage of the ring are avoided.

For a better understanding of my invention, reference may be had to the accompanying drawing in which Fig. 1 is a sectional elevation view of a portion of a compressor illustrating my invention; Fig. 2 is an end view of a portion of the structure illustrated in Fig. 1; and Fig. 3 is an enlarged sectional elevation view of a portion of the structure illustrated in Fig. 1.

Referring now to the drawing, there is shown a portion of a reciprocating compressor 1 which includes a frame 2. The frame is provided with a cylindrical passage 3 for receiving the reciprocating piston 4. The piston is connected by a connecting rod 5 to a crankshaft 6. One end 7 of the crankshaft 6 is journaled in a shaft bearing 8 provided in the frame 2. The other end 9 of the crankshaft is journaled within a slidable bushing 10, and the bushing is received within a bore 11 in the frame. The bushing is locked against rotation relative to the frame by a pin 12, which fits within complementary semi-cylindrical grooves 13 and 14 in the frame and bushing respectively.

In constructing compressors of this type in mass production there may be some slight variations in the dimensions of the various parts. In order to insure proper alignment of the moving parts of the compressor and in order to limit the amount of end play despite such variations, a ring and groove construction is provided adjacent the end 9 of the shaft. This ring and groove construction includes an annular groove 15 formed in the bore 11 and a cooperating flat resilient member or ring 16 which is adapted to fit within the groove. As best shown in Fig. 2, member 16 is an arcuate, substantially ring-shaped element. The member 16 includes two enlarged portions or ears 17, each of which includes a tool-receiving opening 18. In making the assembly a member 16 of the proper thickness to secure the desired end play is chosen and the diameter is reduced by moving the ears 17 toward each other by the use of a suitable tool (not shown), such as a specially constructed pair of pliers fitting into the openings 18. The diameter of the member is reduced so that it can pass through the opening 19 in the frame. When the member 16 is positioned in line with the grove 15 the ears are released so that the member 16 expands to the size shown, locking itself within the groove 15. The member 16 is formed of the material having a natural resilience so that it tends to return to its expanded shape as soon as the ears 17 are released.

Referring to Fig. 1, it can be seen that one wall of the flat resilient member 16 engages a wall of the groove 15 and the other wall of the member 16 engages the slidable bushing 10. The shaft 6 includes two shoulders 20 and 21. The shoulder 20 is adapted to bear against a thrust bearing formed by a surface 22 of the frame. The other shoulder 21 is engaged by the surface 23 of the slidable bushing 10. It can be seen, therefore, that the amount of end play is limited by the member 16 and that this end play can be adjusted by utilizing members 16 of different thicknesses. It will be noted further that the member 16 in its assembled position prevents the pin 12 from coming out of the grooves 13, 14.

The idea of using a flat resilient member or ring within a groove in the frame to limit or adjust the amount of end play is not my invention and has been used commercially for some time. However, in the conventional structure of this type an annular groove is provided which has a bottom parallel to the axis of the shaft and I have found that when such a construction is utilized the presence of fillets at the bottom corners of the groove often prevents the resilient member 16 from fitting flush against the adjacent wall of the groove. This contributes to an inaccurate positioning of the resilient member within the groove and, hence, to an inaccurate positioning of the wall of the member which engages the slidable bushing 10. Furthermore, the lack of a flush engagement between the ring and the adjacent wall of the groove causes a warping or distortion of the resilient member so that in lieu of presenting a flat face to the slidable bushing 10 and in lieu of providing a fixed end play, the resilient member presents a spring force longitudinally of the shaft resulting in undesirable binding.

By my invention I have provided a particular shape of groove which overcomes these difficulties and insures a proper and definite positioning of the resilient member 16. This construction is best illustrated in Fig. 3. The annular groove 15 includes a wall 24 which is disposed in a plane perpendicular to the axis of the shaft and a second wall 25 parallel to the first wall and spaced therefrom. The bottom 26 of the groove 15 extending between the walls 24 and 25 is inclined with respect to the axis of the shaft. This bottom wall 26 is inclined outwardly in the direction of the wall 24 which is engaged by the resilient member 16. The resilient member 16 includes one wall or face 27 which is adapted to engage the wall 24 of the groove and a second wall or face 28 which is adapted to engage a surface 29 of the slidable bushing. As shown in Fig. 3, when the resilient member 16 is in its expanded position against the bottom wall 26 of the groove, the resilient member 16 engages the bottom wall only along the circumferential edge 30 of the member 16 which is in the plane of the wall 28 of the member 16. The circumferential edge 31 which is in the plane of the wall 27 of the member 16 is spaced from the bottom 26 of the groove. It can be seen, therefore, that when the resilient member 16 is positioned in line with the groove 15 and is released so that its natural resilience causes it to expand against the bottom 26 of the groove the circumferential edge 30 engages the inclined bottom of the groove and the expansion of the member 16 naturally urges the member toward the end of the groove 15 wherein the member 16 can expand the greatest amount. In other words the member 16 in expanding urges itself to the right along the inclined bottom 26 of the groove and in so doing urges the face 27 of the member 16 into firm engagement with the wall 24 of the groove. Furthermore, since the edge 31 of the resilient member 16 is spaced from the bottom of the groove the presence of a fillet 32 at the intersection of the bottom 26 and the wall 24 of the groove has no effect on the positioning of the resilient member 16, and the face 27 of the member 16 fits flush against the wall 24 of the groove. Were the bottom wall of the groove parallel to the axis of the shaft the presence of a fillet at the point shown would necessarily tend to force the outer edge of the resilient member 16 slightly to the left, distorting the member and preventing the member from fitting flush against the wall 24 of the groove. Moreover, where the bottom of the groove is arranged parallel to the axis of the shaft the expanding force of the resilient member has no tendency to urge the resilient member to the right against the wall 24 of the groove as in my construction. By my invention, therefore, a construction is provided wherein the natural resilience of the member 16 is utilized to force the member into firm engagement with the wall 24 of the groove and, moreover, the flush engagement of the member with the wall is insured by the fact that any fillet present at the base of the groove can have no effect in causing angled positioning or distortion of the member 16. Moreover, this flush engagement of the member 16 with the wall 24 secures a definite and accurate positioning of the shaft with the desired amount of end play and prevents warping of the member 16 which might introduce a resilient force longitudinally of the shaft, which force might result in a binding of the shaft.

While I have shown and described a specific embodiment of my invention, I do not desire my invention to be limited to the particular construction shown and described, and I intend by the appended claims to cover all modifications within the spirit and scope of my invention.

What I claim as new and desire to secure by Letters Patent of the United States is:

1. In a compressor or the like including a frame having a bore therein, a bushing slidably disposed in said bore and a shaft journaled in said bushing, means providing a thrust bearing for said shaft, said means comprising a shoulder formed on said shaft, said bushing being arranged to engage said shoulder, an annular inwardly-facing groove in said bore adjacent said bushing, said groove including a wall in a plane perpendicular to the axis of the said shaft, and a resilient arcuate member received within said groove, one wall of said member engaging said wall of said groove, the other wall of said member engaging said bushing, the bottom of said groove being inclined outwardly with respect to the axis of said shaft in the direction of said wall of said groove whereby the resilience of said member in expanding against the bottom of said groove forces said member flush against said one wall of said groove.

2. In a compressor or the like including a frame having a bore therein, a bushing slidably disposed in said bore and a shaft journaled in said bushing means providing a thrust bearing for said shaft, said means comprising a shoulder formed on said shaft, said bushing being arranged to engage said shoulder, an annular inwardly-facing groove in said bore adjacent said bushing, said groove including a wall in a plane perpendicular to the axis of said shaft, and a flat resilient arcuate member received within said groove, one wall of said member engaging said wall of said groove, the other wall of said member engaging said bushing, the bottom of said groove being inclined outwardly with respect to the axis of said shaft in the direction of said wall of said groove, the circumferential edge of said member in the plane of said other wall of said member engaging the bottom of said groove whereby as said member is forced outwardly against the bottom of said groove under its natural resilience said member is urged by said inclined bottom against said wall of said groove, the circumferential edge of said member in the plane of said one wall of said member being spaced from the bottom of said groove whereby any fillet occurring at the intersection of said wall of said groove and said bottom of said groove has no effect in hindering the positioning of said member flush against said wall of said groove.

3. In a compressor or the like, a frame having a bore therein, a bushing slidably disposed in said bore, a shaft journaled in said bushing, a first thrust bearing formed on said frame, said shaft including a shoulder adapted to engage said first bearing, an annular inwardly-facing groove formed in said frame spaced from said first thrust bearing, said groove including a wall perpendicular to the axis of said shaft, a second shoulder on said shaft, said bushing being arranged to engage said second shoulder, and a resilient arcuate member inserted within said groove and adapted to be urged outwardly by its natural resilience against the bottom of said groove, said bottom of said groove being inclined outwardly with respect to the axis of said shaft in the direction of said perpendicular wall of said groove whereby the force urging said member against the bottom of said groove causes said member to move into flush engagement with said perpendicular wall of said groove, the opposite wall of said member engaging said bushing.

EMMETT G. GARDINER.

REFERENCES CITED

The following references are of record in the file of this patent:

FOREIGN PATENTS

| Number | Country | Date |
|---|---|---|
| 785,957 | France | Oct. 23, 1935 |